United States Patent [19]

Wright et al.

[11] Patent Number: 4,534,599
[45] Date of Patent: Aug. 13, 1985

[54] ELECTRO-HYDRAULIC BRAKE CONTROL SYSTEM FOR A TRAIN

[75] Inventors: Eric C. Wright, Watertown; Ronald E. Fairman, Adams, both of N.Y.

[73] Assignee: General Signal Corporation, Stamford, Conn.

[21] Appl. No.: 444,548

[22] Filed: Nov. 26, 1982

[51] Int. Cl.³ ............................................. B60T 8/18
[52] U.S. Cl. .................................... 303/22 R; 188/195
[58] Field of Search ............... 303/15, 20, 23 R, 22 R; 188/195

[56] References Cited

U.S. PATENT DOCUMENTS

| | | | |
|---|---|---|---|
| 2,082,026 | 6/1937 | Powers | 188/195 |
| 3,398,993 | 8/1968 | Sarbach et al. | 303/22 R |
| 3,920,285 | 11/1975 | Maskery | 303/22 R |

FOREIGN PATENT DOCUMENTS 1430363 11/1968 Fed. Rep. of Germany ...... 188/195

Primary Examiner—George E. A. Halvosa
Assistant Examiner—Alvin Oberley
Attorney, Agent, or Firm—Thomas R. Fitzgerald; Harold S. Wynn

[57] ABSTRACT

Electro-hydraulic brake control apparatus is provided for respective vehicles of a train in an electric train line brake control system having load sense circuits for generating analog signals when enabled by an emergency braking designation for limiting the extent of emergency brake applications for respective vehicles of the train in accordance with the load of the vehicle. Generating of the analog signals, when enabled, is continuously variable in accordance with the load of the vehicles; but is at other times normally inactive.

4 Claims, 3 Drawing Figures

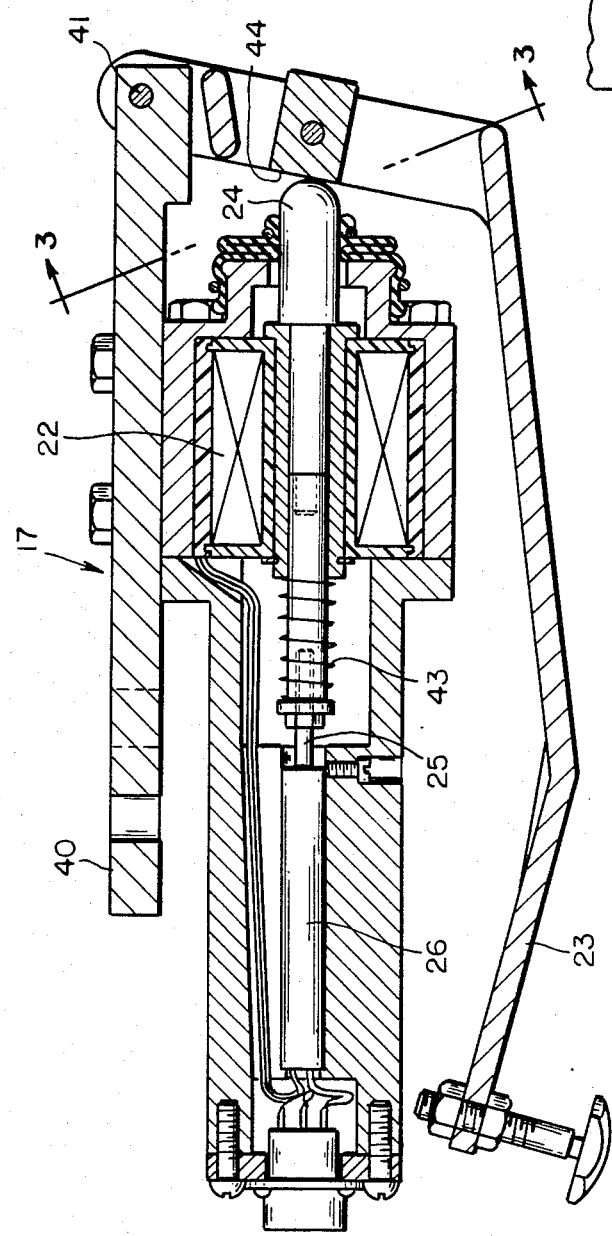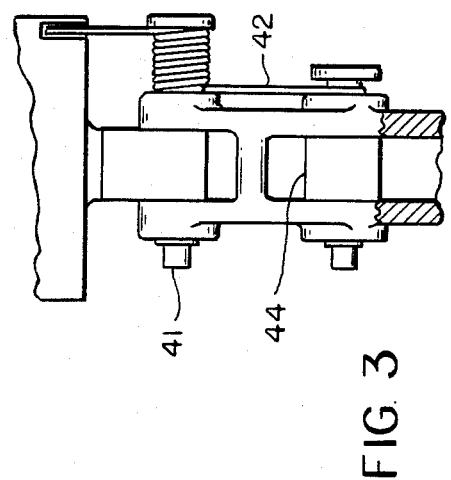
FIG. 2
FIG. 3

ELECTRO-HYDRAULIC BRAKE CONTROL SYSTEM FOR A TRAIN

REFERENCE TO PRIOR CASES

This invention relates to a prior U.S. Pat. No. 4,080,005, granted Mar. 21, 1978, which is assigned to the same assignee as the present invention, and to the prior U.S. Patents of Klein No. 2,517,885, Kirk No. 3,460,870, and Cripe No. 4,316,640. These patents are incorporated herein by reference for a better understanding of the background of the present invention.

The present invention relates to electric train line brake control systems for governing power operation of brakes of a plurality of vehicles of a train, and it more particularly relates to control of emergency braking in accordance with variable loads of the vehicles of the train.

In one well known type of train line brake control system, a brake control train line carries an electrical analog signal that varies inversely in amplitude with the degree of braking that is designated for the vehicle, emergency braking designation providing a zero analog signal in the brake control train line. The train line analog brake control signals are applied to hydraulic brake pressure servo apparatus, which in turn delivers a hydraulic pressure output proportional to the analog signal for controlling one or more hydraulic brake mechanisms of each vehicle.

Empty-load brake control systems, such as the system disclosed in the Engle U.S. Pat. No. 4,080,005, for example, provide sufficient control in accordance with vehicle load for freight vehicles, but do not provide the smooth load compensated braking control required for passenger vehicles, particularly of the light rail vehicle type.

An object of the present invention is to provide an electric train line brake control system which substantially obviates one or more of the limitations of the described prior art systems.

Another object of the present invention is to provide an improved electric train line brake control system having a system responsive to the designation of an emergency brake control for generating an electrical analog brake control signal for governing the degree of braking during an emergency application that is continuously variable in accordance with the load of the vehicle.

Other objects, purposes and characteristic features of the present invention will be in part obvious from the accompanying drawings and in part pointed out as the description of the invention progresses.

SUMMARY OF THE INVENTION

An electric train line brake control system is provided for governing hydraulic operation of brakes of a plurality of vehicles of a train comprising electro hydraulic brake control apparatus for each vehicle effective to govern braking pressure in inverse proportion to the degree of energerization of a brake control train line.

Improved electro-hydraulic brake control apparatus comprises a load sense signal generator operable, when activated, to generate an analog signal for governing operation of the electro-hydraulic brake control apparatus that is continuously variable in proportion to the load of the vehicle.

The load sense signal generator is activated by load sense activating apparatus rendered effective in response to the sensing of an emergency brake control designation.

For a better understanding of the present invention, together with other and further objects thereof, reference is had to the following description, taken in connection with the accompanying drawings.

IN THE DRAWINGS

FIG. 2 is a elevational view, partly in cross section, of a load sensing mechanism for the preferred embodiment of the present invention, shown in its normally inactive condition; and FIG. 3 is a sectional view of the preferred embodiment, taken along with section line 3—3 of FIG. 2.

Figure 1:
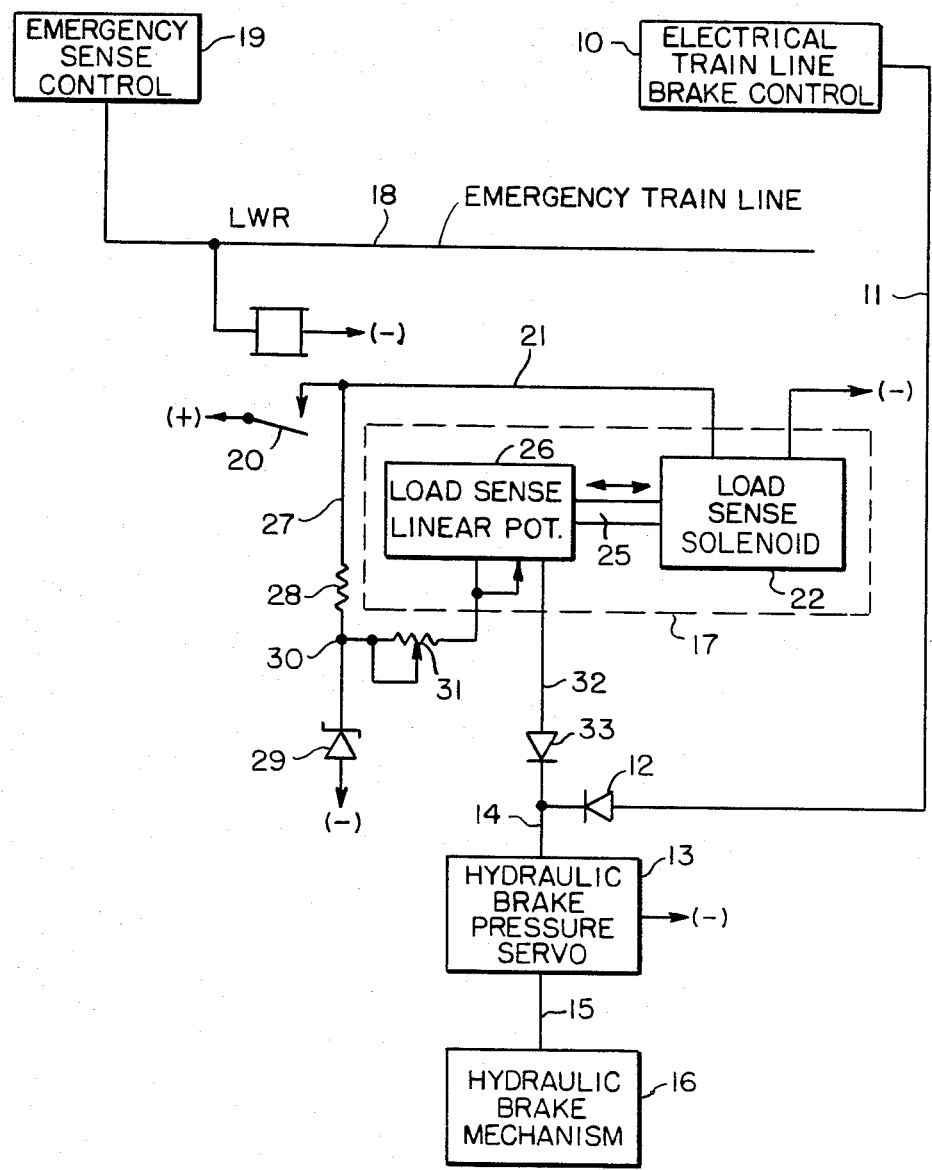
FIG. 1 is a schematic illustration, partly by block diagram, of an electric train line brake control system according to a preferred embodiment of the present invention.

With reference to FIG. 1, an electric train line brake control system 10 is illustrated as being provided for governing power operation of brakes of a plurality of vehicles of a train. This brake control system controls the brakes of each vehicle of a train by generating a brake control analog signal that is inversely variable in amplitude in accordance with brake control designation. This brake control signal is applied on each vehicle over a line 11, through a diode 12, to a hydraulic brake pressure servo mechanism 13 over line 14. This signal governs an output on line 15 for actuating a hydraulic brake mechanism 16.

A normally inactive load sense signal generator 17 is provided for generating, when rendered effective in response to an emergency brake designation, a continuously variable analog signal that varies inversely with the load of the vehicle for control of the brakes so that different vehicles of the train, and also different trucks of each vehicle, can generate different braking control analog signals to provide for smooth emergency braking of each vehicle in accordance with which of the vehicles of the train are loaded.

A normally deenergized emergency train line 18 is provided for selectively activating load sense signal generators 17 for the respective trucks of vehicles of the train in response to emergency sense control apparatus 19 that applies energy to the emergency train line 18 when an emergency braking condition has been designated. Energization of the emergency train line 18 energizes a load weight relay LWR, and the picking up of this relay applies energy through its front contact 20 over line 21 to load sense solenoid apparatus 22 for activating a load sense linear potentiometer 26. This generates an analog signal for input to the hydraulic brake pressure servo 13 that is continuously variable for governing the electro-hydraulic brake control apparatus 13 and 16 in accordance with the load on the associated truck of the vehicle that is sensed by operation of a load sense lever 23 (see FIG. 2). The load sense solenoid 22 actuates its plunger 24 longitudinally, which in turn axially operates a wiper rod 25 of load sense potentiometer 26.

With reference to FIG. 1, a regulated voltage divided circuit is closed at front contact 20 by the energization of relay LWR, through wire 27, resistor 28, and Zener diode 29. The load sense potentiometer 26 is connected to the voltage divider circuit at 30 through a trimming potentiometer 31, and the linear adjustment of the potentiometer wiper rod 25 in accordance with the vehicle load, applies an output of load sense linear potentiometer 26 to input wire 14 of hydraulic brake pressure servo 13 through wire 32 and diode 33. This control circuit is connected in multiple with the circuit from the electric train line brake control apparatus 10 over line 11, but this circuit receives no energization during an emergency brake application.

With reference to FIG. 2, the load sense signal generator 17 has a mounting plate 40 adapted to be secured to a portion of the car body, and the movable load sensing arm 23 is pivoted at 41 at the right hand end of the plate 40. The arm 23 is normally biased downwardly from the position in which it is shown in FIG. 2 by a suitable spring 42 (see FIG. 3) to contact a side frame portion of a car truck (not shown), thus sensing deflection of the car springs as an indication of load on the truck. A spring 43 biases the wiper arm 25 of potentiometer 26 to a normal left hand position. The potentiometer wiper 25 is adjustably secured to the solenoid plunger 24 of the load sense activating solenoid 22.

It will be readily apparent that the solenoid plunger 24 is biased to its normal left hand position by the spring 43, and is actuated by energization of the solenoid 22 to act against a pad 44 on the load sense arm 23 which is normally biased by spring 42 downwardly against an unsprung portion of the truck frame (not shown), indicative of the load on the vehicle. Thus the plunger 24 of the solenoid 22 is operated to a right hand position in accordance with the load of a vehicle, and the wiper arm 25 of potentiometer 26 is accordingly actuated to a right hand position to generate an analog signal inversely comparable to the vehicle load. Thus the sensing potentiometer is decoupled from the spring deflection oscillations during normal operations, greatly improving its life.

It will be noted that this structure is on the side of safety in that if anything should happen that the wiper rod 25 of potentiometer 26 should fail to be actuated by the solenoid 22, for example, because of failure of the solenoid 22 to be energized in response to an emergency brake application, no signal will be generated and applied over line 32 to the hydraulic brake pressure servo 13, resulting in maximum emergency brake application.

Having thus described a train line brake control system having improved emergency brake control in accordance with the load of the vehicle as a preferred embodiment of the present invention, it is to be understood that various modifications and alterations may be made to the specific embodiment shown, without departing from the spirit or scope of the invention.

What is claimed is:

1. An electric train line brake control system for governing power operation of brakes of a plurality of vehicles of a train comprising electro-hydraulic brake control means for each vehicle effective to govern braking pressure in inverse proportion to the degree of energization of said brake control means such that braking pressure is increased for an increased load wherein the improved electro-hydraulic brake control means comprises:

(a) load sense signal generating means operable in response to designation of emergency braking to generate a signal continuously variable for governing the electro-hydraulic brake control means in a continuously variable manner in accordance with the load of the vehicle, the load sense signal generating means comprising;
      (1) a normally deenergized emergency train line connecting the vehicle of the train for energization to govern the brake control means on each vehicle,
      (2) emergency sense control means for energizing the emergency train line upon sensing an emergency brake control designation,
      (3) a lever for sensing vehicle load by measuring a degree of deflection of springs of the vehicle as an indication of load,
      (4) solenoid means responsive to energization of the emergency train line for activating the lever, and
   (b) means including a linear potentiometer actuated jointly by the lever and the solenoid means for generating the load sense signal so as to vary inversely as the load of the vehicle for governing the hydraulic brake control means.

2. An electric train line brake control system according to claim 1 wherein the solenoid means has a plunger operably connecting an axially movable wiper arm of the potentiometer to an intermediate point on the lever for adjusting the potentiometer by linear motion in accordance with the load of the vehicle, and means is provided for spring biasing the potentiometer wiper arm to a normal inactive position.

3. An electric train line brake control system according to claim 1 wherein the load sense signal generating means comprises regulated voltage dividing means activated by the sensing of an emergency braking control designation for energizing the potentiometer to deliver an analog signal to the brake control means that varies inversely as the load of the vehicle.

4. An electric train line brake control system according to claim 3 wherein electro hydraulic servo means is provided for generating hydraulic braking pressure at times when an emergency braking control is designated in response to the analog signal and at other times in response to energization of a normal brake control line for governing the brakes of the vehicle.

* * * * *